United States Patent
Kato

(10) Patent No.: US 6,721,004 B1
(45) Date of Patent: Apr. 13, 2004

(54) TV LENS OPERATING UNIT

(75) Inventor: Hiroshi Kato, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/274,554

(22) Filed: Mar. 23, 1999

(30) Foreign Application Priority Data

Mar. 24, 1998 (JP) .......................................... 10-075401

(51) Int. Cl.[7] .............................................. H04N 5/262
(52) U.S. Cl. ................................................ 348/240.99
(58) Field of Search ........................ 348/240.99, 240.1, 348/240.2, 240.3, 335, 345, 347, 357

(56) References Cited

U.S. PATENT DOCUMENTS

| | | | | |
|---|---|---|---|---|
| 5,204,710 A | * | 4/1993 | Tsukamoto et al. | ......... 348/345 |
| 5,287,223 A | * | 2/1994 | Hirasawa | ................... 348/345 |
| 5,530,476 A | * | 6/1996 | Morikawa et al. | .......... 348/375 |
| 6,133,951 A | * | 10/2000 | Miyadera | .................... 348/335 |
| 6,271,882 B1 | * | 8/2001 | Kawamura et al. | ......... 348/335 |

* cited by examiner

Primary Examiner—Wendy R. Garber
Assistant Examiner—Rashawn N. Tillery
(74) Attorney, Agent, or Firm—Birch, Stewart, Kolasch & Birch, LLP

(57) ABSTRACT

A zooming of a TV lens is performed by operating a thumb ring of a zoom demand. Pressing a quick zoom switch provided on the zoom demand can successively move the zoom toward a widephoto end or a telephoto end by a one-touch operation. Moreover, the moving direction of the zoom on the quick zooming can be switched by a switch provided on the zoom demand.

11 Claims, 5 Drawing Sheets

F I G. 1
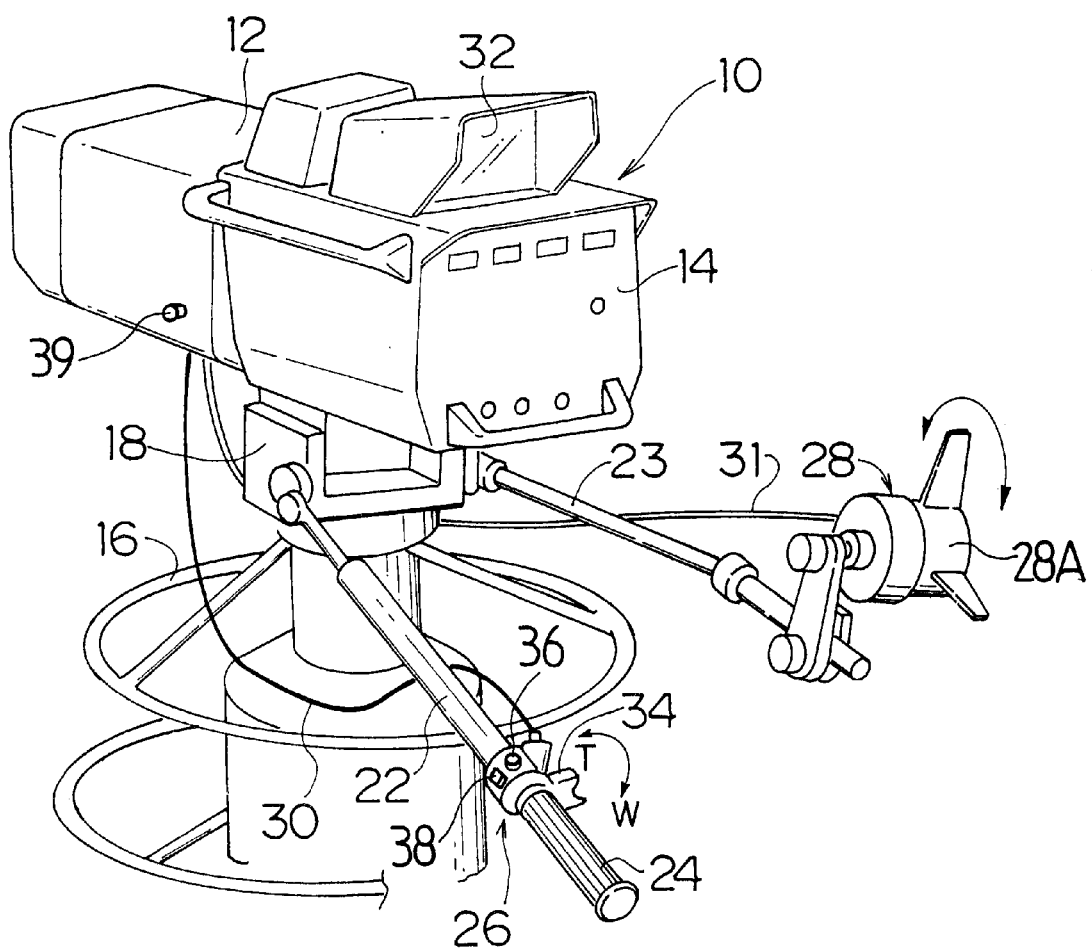

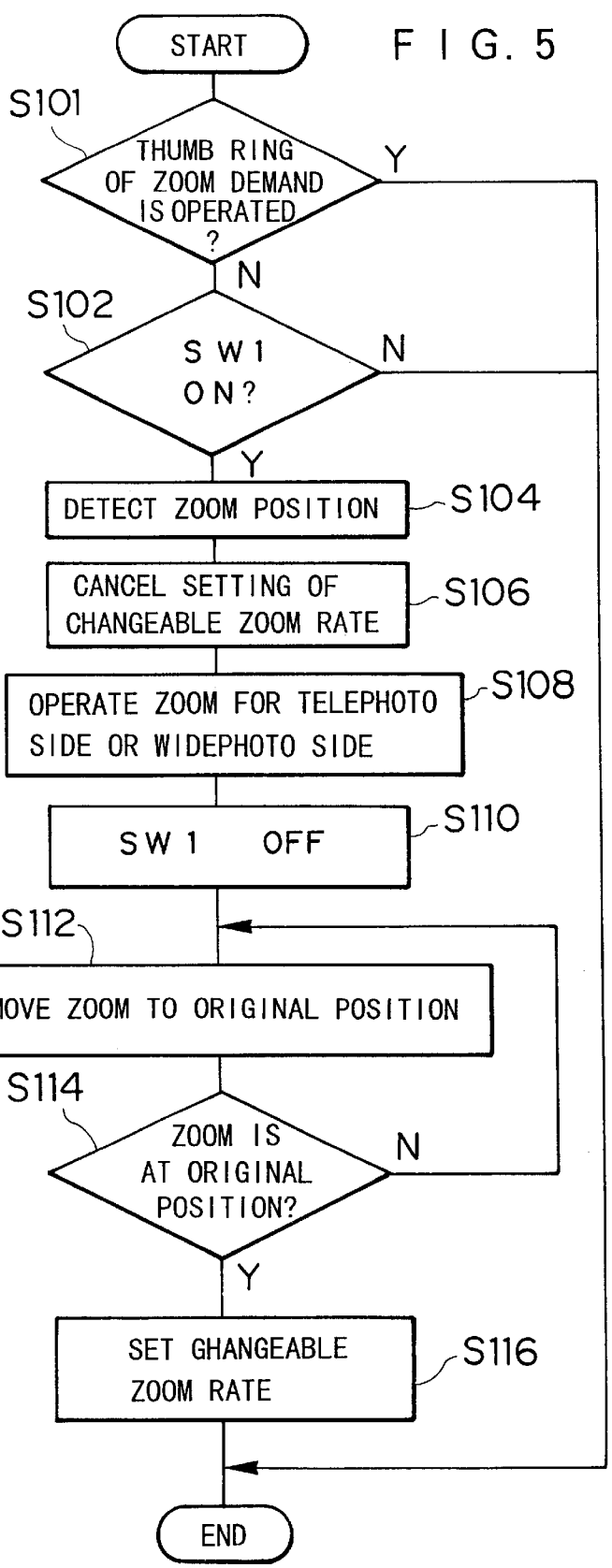

TV LENS OPERATING UNIT

BACKGROUND OF THE INVENTION

1. Field of the Invention

The present invention relates generally to a TV lens operating unit, and more particularly to a TV lens operating unit in which a quick zooming function is installed.

2. Description of Related Art

In an electronic news gathering (ENG) camera, a lens drive unit is attached to the side of a lens barrel. A zoom drive motor and an iris drive motor are arranged in the drive unit. Switch members, provided to the drive unit, are operated and the motors are driven, thereby a zoom ring and an iris ring of the lens barrel are rotated by the motors.

Conventionally, a drive unit, installed with a function called quick zooming, is known. In the quick zooming function, pressing an operation button (hereinafter referred to as a quick zoom switch) rotates the zoom ring to a telephoto side so as to successively move the zoom ring to the telephoto side, and releasing the quick zoom switch causes the zoom ring to rotate to the widephoto side so as to return the zoom to its original position. Japanese Patent Application No. 9-315651 discloses a drive unit in which a quick zooming function is installed. The drive unit prevents a problem, which happens when the quick zoom switch is mistakenly operated during a normal zooming operation; and the maximum zoom rate at normal zooming operation can be set independently of a zoom rate at quick zooming.

In case of TV shooting in a studio and outdoor sport broadcast, generally a TV lens called an electronic field production (EFP) lens is used. The EFP lens is constructed differently from the above-mentioned ENG lens in that the EFP lens has a built-in motor for driving the lens, and the motor is driven and controlled based on a control signal input from an outside controller. However, up to this present time, no EFP lens has ever had a quick zooming function. Consequently, there was nothing suggested for positions of operation buttons and a circuit arrangement and so forth of the conventional EFP lens with the quick zooming function.

Moreover, a moving direction of a zoom by quick zooming was in many cases fixed to either a widephoto side or a telephoto side; in the majority of cases was the telephoto side. However, there are many cases to use the zoom at the telephoto side in sport broadcast for instance; in this case it would be necessary to perform quick zooming to the widephoto side in order to instantly view the whole scene.

SUMMARY OF THE INVENTION

The present invention has been developed in view of the above-described circumstances, and has as its object the provision of a TV lens operating unit which drives and controls built-in motors based on control signals transmitted from an outside controller and moves a focus lens and a variable lens by driving the motors; wherein a preferable zooming operation can be performed with a quick zooming function.

In order to achieve the above-described object, the present invention is directed to a TV lens operating unit for operating a TV lens including a focus lens and a variable lens moved in accordance with control signals sent from the TV lens operating unit, the TV lens operating unit comprising: an operating member for ordering, by a one-touch operation thereof, the TV lens to perform a quick zooming wherein the variable lens is successively moved in one of a direction of a widephoto side and a direction of a telephoto side.

The TV lens operating unit further comprises: a focus demand for outputting the control signal to move the focus lens; and a zoom demand for outputting the control signal to move the variable lens; wherein the operating member is provided to one of the focus demand and the zoom demand.

The TV lens operating unit further comprises a switch for selecting a moving direction of the variable lens on the quick zooming from the directions of the widephoto side and the telephoto side.

The TV lens may comprise a switch for selecting a moving direction of the variable lens on the quick zooming from the directions of the widephoto side and the telephoto side.

The operating member may comprise a first operating member for moving the variable lens in the direction of the widephoto side and a second operating member for moving the variable lens in the direction of the telephoto side.

According to the present invention, the quick zooming is easy to perform since the operating member for the quick zooming is provided to the controller that performs focusing and zoom adjustment.

In addition, the quick zooming function can be used more effectively than conventional one because the moving direction of the zoom with the quick zooming is selected by the switch, and the quick zooming can be performed to the widephoto side or the telephoto side according to a shooting condition.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a perspective view showing an embodiment of a TV camera device to which the present invention is applied;

FIG. 5 is a flow chart showing a flow of quick zooming.

DETAILED DESCRIPTION OF THE PREFERRED EMBODIMENT

Figure 2:
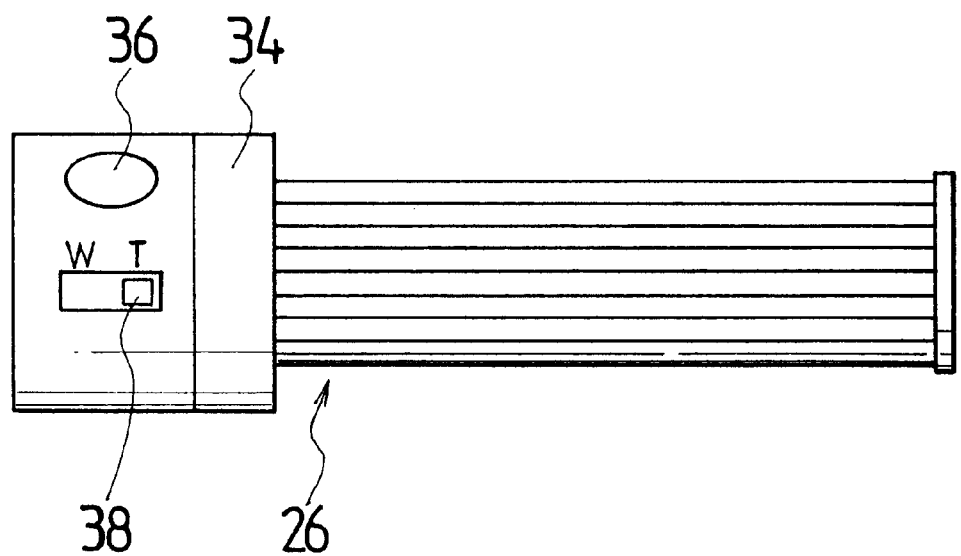
FIG. 2 is a plan view of a zoom demand.

Hereunder the preferred embodiment for a TV lens operating unit of the present invention is described in detail according to the accompanying figures.

FIG. 1 is a perspective view of an embodiment of a TV camera device to which the present invention is applied. As shown in FIG. 1, a TV camera device 10 comprises a TV lens 12 and a camera main body 14, and the TV camera device 10 is supported on a panhead 18 on a pedestaldolly 16. Two operating rods 22, 23 are extended to the panhead 18. A zoom demand 26 is attached to the end of the operating rod 22, and a focus demand 28 is attached to the end of the operating rod 23.

The focus demand 28 is provided with a rotatable focus ring 28A; the focus demand 28 determines an amount of rotation of the focus ring 28A with a potentiometer, and inputs its voltage signal to the TV lens 12 via a cable 31. The TV lens 12 drives a focus driving motor to move the focus lens at the position which is indicated with the voltage signal from the focus demand 28.

The zoom demand 26 is provided with a rotatable thumb ring 34. The zoom demand 26 determines a direction and an amount of rotation of the thumb ring 34 with a potentiometer, and inputs its voltage signal to the TV lens 12 via a cable 30. The TV lens 12 drives a zoom driving motor to move a variable lens with the rate which is indicated with the voltage signal from the zoom demand 26. On a side of the TV lens 12 is provided with a maximum zoom rate adjustment knob 39. Rotating the knob 39 can appropriately adjust the zoom rate (the maximum zoom rate) when rotating the thumb ring 34 the furthest.

A cameraman performs focus adjustment by rotating the focus ring 28A of the focus demand 28 with the right hand while viewing an image on a view finder 32; also at the same time he operates the thumb ring 34 of the zoom demand 26 with the left hand and performs zoom adjustment.

Moreover, as shown in FIG. 2, the zoom demand 26 is provided with a quick zoom switch 36 and a switch 38, which are a button switch and a slide switch, respectively. Details for the switches are to be explained later. When the quick zoom switch 36 is pressed, the variable lens moves to a widephoto end or a telephoto end at a preset zoom rate (high rate) while the switch is pressed. When the quick zoom switch 36 is released from pressing, the variable lens returns to its original position (the position of the variable lens when the quick zoom switch 36 is pressed) at the preset zoom rate. Moreover, the direction in which the variable lens moves when pressing the quick zoom switch 36 can be changed to a direction toward either the widephoto end or the telephoto end by switching the switch 38.

Figure 3:
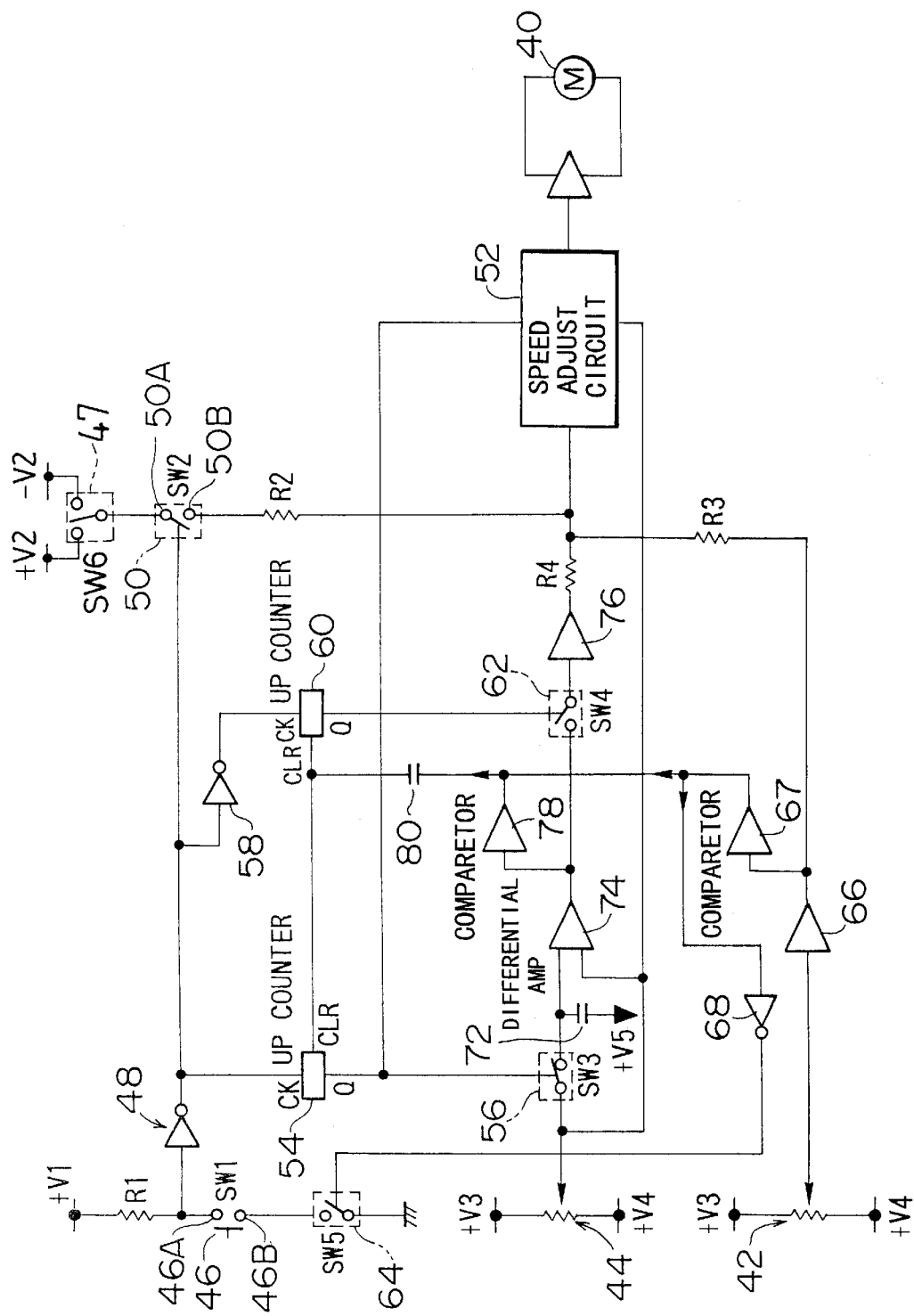
FIG. 3 is a circuit diagram showing an example of a circuit construction of a variable lens drive unit.

FIG. 3 shows a drive circuit of the variable lens of the TV lens 12. In FIG. 3, reference numeral 40 is a zoom drive motor, 42 is a potentiometer that determines the amount of rotation of the thumb ring 34, 44 is a potentiometer that determines the position of the variable lens (the zoom position), 46 is an automatic return switch (hereinafter referred to as a switch SW1) that is equivalent to the quick zoom switch 36, and 47 is a switch (hereinafter referred to as a switch SW6) that is equivalent to the switch 38 of the zoom demand 26.

One terminal 46A of the switch SW1 connects to a voltage terminal (+V1) via a resistor R1, and also connects to an input terminal of a NOT gate 48. The output of the NOT gate 48 is divided into three routes, and one is guided to a relay 50 (hereinafter referred to as a switch SW2) to open and close a contact of the switch SW2 (a contact of a normally open circuit).

One terminal 50A of the switch SW2 connects to either a voltage terminal (+V2) or a voltage terminal (−V2), and the other terminal 50B of the switch SW2 connects to an input terminal of a rate adjustment circuit 52 via a resistor R2. The voltages of the voltage terminal (+V2) and the voltage terminal (−V2) are equivalent to a telephoto signal (TELE SIG.) and a widephoto signal (WIDE SIG.), which cause the variable lens to move toward the telephoto end and the widephoto end, respectively. Either of the voltage terminals connects to the switch SW2 by the switch 38 of the zoom demand 26. When the switch SW1 is pressed to turn on the switch SW2, the telephoto signal or the widephoto signal from the voltage terminal connected by the switch SW6 runs the zoom drive motor 40.

The output terminal of the NOT gate 48 also connects to an input terminal (CK) of an input-output circuit 54 such as an up counter, and the output of the input-output circuit 54 opens and closes a contact (a contact of a normally closed circuit) of a relay 56 (hereinafter referred to as a switch SW3).

Further, the output of the NOT gate 48 is guided to an input terminal (CK) of a input-output circuit 60 such as an up counter through a NOT gate 58, and the output of the input-output circuit 60 opens and closes a contact (a contact of a normally open circuit) of a relay 62 (hereinafter referred to as a switch SW4).

The other terminal 46B of the switch SW1 connects to a ground through a relay 64 (hereinafter referred to as a switch SW5).

An output signal is transmitted from the potentiometer 42 of the thumb ring 34 to the switch SW5 through an amplifier 66, a comparator 67 and a NOT gate 68. Operating the thumb ring 34 opens the contact (a contact of a normally closed circuit) of the switch SW5. This invalidates the operation of the switch SW1 while the thumb ring 34 is operated, thereby prioritizing the operating of the thumb ring 34.

The output of the potentiometer 42 of the thumb ring 34 is transmitted to the input terminal of the rate adjustment circuit 52 via the amplifier 66 and a resistor R3. The rate adjustment circuit 52 generates a motor drive signal that realizes a zoom rate conforming to the controlled amount of the thumb ring 34 in accordance with the maximum rate, which is set by the maximum zoom rate adjustment knob 39, and supplies the motor drive signal to the zoom drive motor 40. Thus, when the thumb ring 34 is operated, the zooming is performed at the zoom rate conforming to the controlled amount of the thumb ring 34 with the set maximum rate being the upper limit.

The potentiometer 44 regularly determines the zoom position, and the output signal from the potentiometer 44 is directly transmitted to the rate adjustment circuit 52. When the potentiometer 44 detects that the zoom position has reached to the telephoto end or the widephoto end, the rate adjustment circuit 52 stops the zoom drive motor 40.

The output terminal of the potentiometer 44, which determines the zoom position, connects to one terminal of a condenser 72 via the switch SW3. The other terminal of the condenser 72 connects to a voltage terminal (+V5). While the switch SW3 is ON, the output voltage of the potentiometer 44 is charged in the condenser 72. When the switch SW1 is turned on to turn off the switch SW3, the zoom position when the switch SW1 is pressed is stored in the condenser 72.

The terminal of the condenser 72, which connects to a contact terminal of the switch SW3, connects to one input terminal of a differential amplifier 74, and the output signal of the potentiometer 44 is directly transmitted to the other input terminal of the differential amplifier 74. Then, the output of the differential amplifier 74 is transmitted to the input terminal of the rate adjustment circuit 52 via the switch SW4, an amplifier 76 and a resistor R4.

Consequently, when the pressing of the switch SW1 is released to turn on the switch SW4, the zoom drive motor 40 is run in accordance with the differential output of the differential amplifier 74. When the position stored in the condenser 72 corresponds to the position detected by the potentiometer 44, the zoom drive motor 40 is stopped. Thus, releasing the switch SW1 returns the variable lens to the original zoom position (the zoom position when the switch SW1 is pressed).

An output terminal of the differential amplifier 74 connects to an input terminal of a comparator 78, and an output terminal of the comparator 78 as well as the output terminal of the comparator 67 connect to one terminal of a condenser 80. The other terminal of the condenser 80 connects to clear (reset) terminals (CLR) of the input-output circuits 54, 60. The output of the comparator 78 gives reset signals to the clear terminals (CLR) of the input-output circuits 54, 60 at the same time.

Specifically, the clear terminals (CLR) of the input-output circuits 54, 60 receive the reset signals while the thumb ring 34 is operated and on completion of the quick zooming returning action. The quick zooming completes when the position stored in the condenser 72 corresponds to the position determined by the potentiometer 44.

The input-output circuits 54, 60 are composed of up-edge type up counters and they output voltage signals to output terminals (Q) according to input signals supplied to input terminals (CK). When clear terminals (CLR) receive the reset signals, the outputs of the input-output circuits 54, 60 become 0.

The output of the input-output circuit 54 is also transmitted to the rate adjustment circuit 52. While the input-output circuit 54 outputs a high-level (H) output signal, the maximum rate setting by the maximum zoom rate adjustment knob 39 is cancelled and the maximum zoom rate is set at a preset zoom rate (e.g., the rate equivalent to the maximum value which can be set by the maximum zoom rate adjustment knob 39).

The zooming is performed at the preset zoom rate during the quick zooming responsive to the operation of the switch SW1, in other words, the zooming in accordance with the telephoto signal from the voltage terminal (+V2) or the widephoto signal from the voltage terminal (−V2) and the returning action to the zoom position stored in the condenser 72.

A description will be given of the operation of the variable lens drive unit, which is constructed in the above-mentioned manner.

Figure 4:
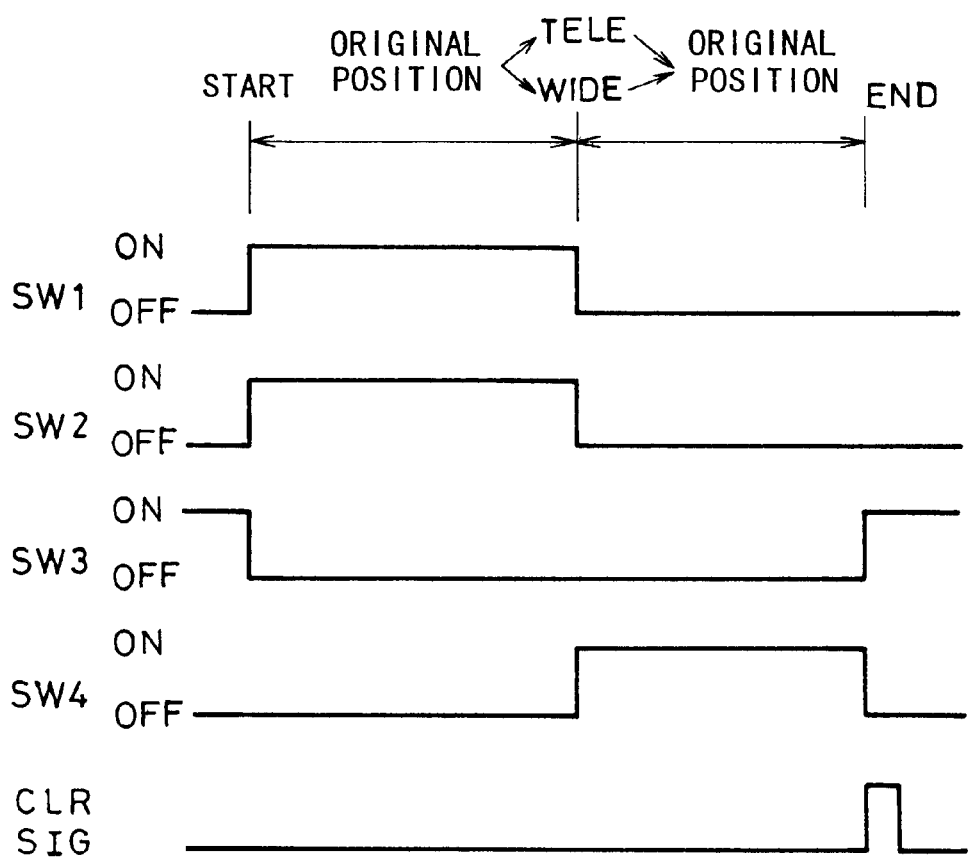
FIG. 4 is a timing chart of the circuit shown in FIG. 3.

FIG. 4 is a timing chart of the switches SW1–SW4 in FIG. 3. In the normal state (not operated), the switches SW1, SW2, SW4, and SW5 are OFF and the switch SW3 is ON.

In response to the operation of the thumb ring 34, the output of the potentiometer 42 is transmitted to the rate adjustment circuit 52 to run the zoom drive motor 40. Then, the zooming is performed at a zoom rate that conforms to the amount of rotation of the thumb ring 34 with the maximum zoom rate set by the maximum zoom rate adjustment knob 39 being the upper limit. During that time, the potentiometer 44 regularly determines the zoom position.

When the thumb ring 34 is operated, the switch SW5 in FIG. 3 is turned off; thus, even if the switch SW1 is pressed during the operation of the thumb ring 34, the output of the NOT gate 48 never changes. In other words, during the operation of the thumb ring 34, the pressing of the switch SW1 is invalid and the thumb ring 34 takes priority over the switch SW1.

When the operation of the thumb ring 34 is stopped, the zoom drive motor 40 is stopped and the switch SW5 is turned on again.

Next, when the switch SW1 is pressed, the output of the NOT gate 48 becomes high level, the switch SW2 is turned on, and the switch SW3 is turned off (see FIG. 4). When the switch SW3 is turned off, the zoom position (the zoom position when the switch SW1 is pressed) is stored in the condenser 72. When the switch SW2 is turned on, the telephoto signal is transmitted from the voltage terminal (+V2), or the widephoto signal is transmitted from the voltage signal (−V2), to the rate adjustment circuit 52.

The variable lens moves toward the telephoto end or the widephoto end in accordance with the telephoto signal from the voltage terminal (+V2), or the widephoto signal from the voltage signal (−V2). At this time, the rate setting by the maximum zoom rate adjustment knob 39 is cancelled to move the variable lens at the preset zoom rate for the quick zooming.

When the switch SW1 is released and the switch SW1 is turned off, the switch SW2 is turned off and the switch SW4 is turned on. This applies the differential output of the differential amplifier 74 to the rate adjustment circuit 52 to run the zoom drive motor 40, which moves the variable lens toward the original position. When the determination signal from the potentiometer 44 corresponds to the signal level of the zoom position stored in the condenser 72, the reset signals are transmitted to the input-output circuits 54, 60, and the switch SW4 is turned off and the switch SW3 is turned on. When the variable lens returns to the original zoom position stored in the condenser 72, the quick zooming function is cancelled.

If the thumb ring 34 is operated while the quick zoom switch 36 (switch SW1) is pressed or while the variable lens is returned to the original position in the quick zooming, the output of the comparator 67 transmits the reset signals to the input-output circuits 54, 60 to cancel the quick zooming function, the operation of the thumb ring 34 is validated.

FIG. 5 shows the flow of the quick zooming performed by the variable lens drive unit. During the quick zooming, it is determined whether the thumb ring 34 is operated or not (step S101). If the thumb ring 34 is operated, the quick zooming function does not work, and the zooming is performed according to the operation of the thumb ring 34.

On the other hand, if the thumb ring 34 is not operated at the step S101, it is determined whether the switch SW1 is operated or not (step S102). If the switch SW1 is OFF, the quick zooming function does not work. If the switch SW1 is ON, the quick zooming function works.

Specifically, the zoom position when the switch SW1 is pressed is determined and stored (step S104), and the rate setting by the maximum zoom rate adjustment knob 39 is cancelled (step S106) to zoom the variable lens in the telephoto direction or in the widephoto direction (the direction selected by the switch 38) at the preset zoom rate (step S108).

After that, when the switch SW1 is turned off (step S110), the variable lens is zoomed toward the original position (step S112). The variable lens is zoomed until it reaches at the zoom position (the original zoom position) stored at the step S104 (step S114). When the variable lens reaches at the original zoom position, the zooming is stopped. On completion of the above-described returning action, the rate setting by the maximum rate adjustment knob 39 is validated (step S116) to complete the quick zooming.

The order of the steps S101 and S102 may be changed. Specifically, before it is determined whether the thumb ring 34 is operated or not, it may be determined whether the switch SW1 is operated or not As described above, the quick zoom switch 36 and the switch 38 are provided to the zoom demand 26 in the above-described embodiment; however these switches may be provided to the focus demand 28. In addition, the switch 38 may be provided to the TV lens 12.

Moreover, in the above-described embodiment, the moving direction of the zoom by the quick zoom switch 36 is switched by the switch 38; however quick zoom switches for quick-zooming to the widephoto side and for quick-zooming to the telephoto side may be provided.

Further, the above embodiment described a case to provide the maximum zoom rate adjustment knob 39 to the TV lens 12; however the maximum zoom rate adjustment knob 39 may be provided to the zoom demand 26 or to the focus demand 28.

Furthermore, the above embodiment described a case for operating the TV lens 12 with a controller (the zoom demand 26 and the focus demand 28) which are arranged at the operating rods 22 and 23 of the panhead 18; though the present invention is not restricted to that. The present invention can be applied to a case for installing the quick zooming function in a panhead system which remote-controls the TV lens 12 installed on a remote controlled panhead by a panhead controller. In other words, providing a switch that corresponds to the above-mentioned quick zoom switch 36 and the switch 38 to the panhead controller enables remote-controlled quick zooming. Similarly, the present invention can be applied to a case for using a controller that operates the TV lens 12 remotely at a location away from a camera.

As described above, according to the TV lens operating unit of the present invention, quick zooming operation is easily performed since the operating member for executing quick zooming in the TV lens which performs focusing and zoom adjustment by the controller is provided to the controller.

Furthermore, the moving direction of the zoom by quick zooming can be switched by a switch, and a zoom can be moved to the widephoto side or the telephoto side in response to a shooting condition; therefore the quick zooming function can be more effectively used than a conventional case.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A TV lens operating unit including a focus lens and a variable lens moved in accordance with control signals sent from the TV lens operating unit, the TV lens operating unit, comprising:

an operating member for ordering, by a one-touch operation thereof, the TV lens to perform a quick zooming wherein the variable lens is successively moved in one of a direction of a widephoto side and a direction of a telephoto side; and a switch for selecting a moving direction of the variable lens on the quick zooming from the directions of the widephoto side and the telephoto side.

2. A TV lens operating unit including a focus lens and a variable lens moved in accordance with control signals sent from the TV lens operating unit, the TV lens operating unit, comprising:

an operating member for ordering, by a one-touch operation thereof, the TV lens to perform a quick zooming wherein the variable lens is successively moved in one of a direction of a widephoto side and a direction of a telephoto side, wherein the TV lens comprises a switch for selecting a moving direction of the variable lens on the quick zooming from the directions of the widephoto side and the telephoto side.

3. A TV lens operating unit for operating a TV lens including a focus lens and a variable lens moved in accordance with control signals sent from the TV lens operating unit, the TV lens operating unit comprising:

an operating member for ordering, by a one-touch operation thereof, the TV lens to perform a quick zooming wherein the variable lens is successively moved in one of a direction of a widephoto side and a direction of a telephoto side; and a member for adjusting a maximum moving rate of the variable lens on the quick zooming; and a switch for selecting a moving direction of the variable lens on the quick zooming from the directions of the widephoto side and the telephoto side.

4. The TV lens operating unit as set forth in claim 1, further comprising:

a focus demand for outputting the control signal to move the focus lens; and a zoom demand for outputting the control signal to move the variable lens, wherein said operating member is provided to one of the focus demand and the zoom demand.

5. The TV lens operating unit as set forth in claim 1, wherein said operating member comprises a first operating member for moving the variable lens in the direction of the widephoto side and a second operating member for moving the variable lens in the direction of the telephoto side.

6. The TV lens operating unit as set forth in claim 1, further comprising a member for adjusting a maximum moving rate of the variable lens on the quick zooming.

7. The TV lens unit as set forth in claim 1, wherein the operating member is configured to order end of the quick zooming operation wherein the variable lens is returned to an original position prior to the quick zooming.

8. The TV lens operating unit as set forth in claim 2, further comprising:

a focus demand for outputting the control signal to move the focus lens; and a zoom demand for outputting the control signal to move the variable lens, wherein said operating member is provided to one of the focus demand and the zoom demand.

9. The TV lens operating unit as set forth in claim 2, wherein said operating member comprises a first operating member for moving the variable lens in the direction of the widephoto side and a second operating member for moving the variable lens in the direction of the telephoto side.

10. The TV lens operating unit as set forth in claim 2, further comprising a member for adjusting a maximum moving rate of the variable lens on the quick zooming.

11. The TV lens unit as set forth in claim 2, wherein the operating member is configured to order end of the quick zooming operation wherein the variable lens is returned to an original position prior to the quick zooming.

* * * * *